US012801121B2

(12) United States Patent
Lu et al.

(10) Patent No.: US 12,801,121 B2
(45) Date of Patent: Nov. 17, 2026

(54) PROCESS CONFIGURATION AND CONTROL SYSTEM FOR UNMANNED CASTING WORKSHOP FOR PRIMARY ALUMINUM AND ALUMINUM ALLOY

(71) Applicant: Guiyang Aluminum Magnesium Design & Research Institute Co., Ltd., Guiyang City (CN)

(72) Inventors: Hui Lu, Guiyang City (CN); Feiya Yan, Guiyang City (CN); Ruoyu Huang, Guiyang City (CN); Jia Zhang, Guiyang City (CN); Haili Xu, Guiyang City (CN); Yu Ao, Guiyang City (CN); Shanwei Tan, Guiyang City (CN); Jun Liu, Guiyang City (CN); Wenjie Ren, Guiyang City (CN)

(73) Assignee: Guiyang Aluminum Magnesium Design & Research Institute Co., Ltd., Guiyang City (CN)

( * ) Notice: Subject to any disclaimer, the term of this patent is extended or adjusted under 35 U.S.C. 154(b) by 363 days.

(21) Appl. No.: 18/678,967

(22) Filed: May 30, 2024

(65) Prior Publication Data

US 2025/0216834 A1 Jul. 3, 2025

(30) Foreign Application Priority Data

Dec. 27, 2023 (CN) ........................ 202311813786.4

(51) Int. Cl.
*G05B 19/4155* (2006.01)

(52) U.S. Cl.
CPC .................. *G05B 19/4155* (2013.01); *G05B 2219/35005* (2013.01)

(58) Field of Classification Search
None
See application file for complete search history.

(56) References Cited

FOREIGN PATENT DOCUMENTS

| | | | | | |
|---|---|---|---|---|---|
| CN | 111482562 | A | * | 8/2020 | B22D 9/00 |
| CN | 113523265 | A | * | 10/2021 | B22D 47/02 |
| CN | 113695550 | A | * | 11/2021 | B22D 17/32 |
| CN | 113946140 | A | * | 1/2022 | G05B 19/41875 |
| CN | 115007830 | A | * | 9/2022 | C22F 1/002 |

* cited by examiner

*Primary Examiner* — David Earl Ogg
(74) *Attorney, Agent, or Firm* — Suiter Swantz IP

(57) ABSTRACT

Disclosed is a process configuration and control system for an unmanned casting workshop for primary aluminum and an aluminum alloy, which relates to the technical field of aluminum smelting. A material transfer system transfers the primary aluminum and the aluminum alloy from an electrolytic workshop to the casting workshop; a smelting casting system burdens and purifies the primary aluminum and the aluminum alloy; a quality inspection system inspects quality to obtain an aluminum ingot qualified in quality inspection; a product package system palletizes, weighs, measures, marks and labels the aluminum ingot qualified in quality inspection; a product storage system stores a packaged aluminum ingot; and a human-computer interaction unit controls starting and stopping of the material transfer system, the smelting casting system, the quality inspection system, the product package system or the product storage system.

10 Claims, 7 Drawing Sheets

PROCESS CONFIGURATION AND CONTROL SYSTEM FOR UNMANNED CASTING WORKSHOP FOR PRIMARY ALUMINUM AND ALUMINUM ALLOY

CROSS REFERENCE TO RELATED APPLICATION

This patent application claims the benefit and priority of Chinese Patent Application No. 2023118137864, filed with the China National Intellectual Property Administration on Dec. 27, 2023, the disclosure of which is incorporated by reference herein in its entirety as part of the present application.

TECHNICAL FIELD

The present disclosure relates to the technical field of aluminum smelting, and in particular to a process configuration and control system for an unmanned casting workshop for primary aluminum and an aluminum alloy.

BACKGROUND

A majority of electrolytic aluminum plants in China refine an electrolytic molten aluminum, remove slag and gas, and then cast primary aluminum into a re-molten aluminum ingot through a casting machine. Faced with a casting workshop featuring high temperature and heavy dust, a production workshop has been equipped with a high-level automation apparatus to achieve integrated control over a discrete apparatus and build an intelligent production control system, which is of great significance for improvement in quality and efficiency of production in the casting workshop, as well as for safety and environmental protection, and is also crucial to construction of intelligent factories in aluminum industry.

At present, a ladle trailer and a ladle lifting trolley in a primary aluminum transfer system are both manually driven during casting production of the re-molten aluminum ingot, lacking reasonable planning and scheduling; sampling, furnace burdening calculation, furnace plug control, and slag scraping work in a smelting system are all manually completed with a harsh working environment and high labor intensity; appearance quality of an ingot in a quality inspection system is mainly determined manually, and an ingot having an appearance quality defect is manually removed, thereby requiring a specialized workstation; and palletizing, bundling, and labeling processes in a product package system are mostly manually completed with high work intensity, and a newly established enterprise is usually equipped with a palletizing robot, a bundling machine, a laser marking machine, etc., but requires a specialized operation workstation with a discrete spatial distribution of apparatuses, and has a poor level of integrated control over the apparatuses. A transfer forklift and a loading trolley in a product storage system are manually driven with high labor intensity and a low storage utilization rate.

To sum up, the casting workshop for the primary aluminum mainly has the problems at present of a harsh working environment, high manpower quota, high labor intensity, high occupational health hazards, high safety hazards, a low degree of automation, a low level of centralized control, and low degrees of informationization and intelligence.

SUMMARY

An objective of an embodiment of the present disclosure is to provide a process configuration and control system for an unmanned casting workshop for primary aluminum and an aluminum alloy, so as to achieve centralized control over multiple types and cross-apparatus in the casting workshop, achieve unattended operation and centralized control of the casting workshop, improve control efficiency of an apparatus in the casting workshop, reduce manual use cost, and improve safety of an operation environment.

To achieve the above purpose, the present disclosure provides the following technical solution:

A process configuration and control system for an unmanned casting workshop for primary aluminum and an aluminum alloy includes: a workshop process configuration and an intelligent casting workshop control system, where the intelligent casting workshop control system at least includes:

a material transfer system including an automatic guided vehicle (AGV) ladle trailer, a ground weigher, an intelligent ladle lifting trolley, and an automatic ladle tilting device, where the material transfer system is configured to transfer the primary aluminum from an electrolytic workshop to the casting workshop; a metal ladle containing liquid primary aluminum is trailed to the casting workshop through the AGV ladle trailer, weighed and measured through the ground weigher, and lifted to an automatic tilting device station having a highest demand priority by the intelligent ladle hoisting trolley through calculation of a scheduling algorithm of the intelligent casting workshop control system in combination with a liquid level of a holding furnace and operation plan requirements, the tilting device receives a positioning signal, and then automatically tilts the ladle, and molten aluminum flows out to be injected into the holding furnace through a chute; and the positioning signal is sent by a sensor of the AGV ladle trailer;

a smelting casting system connected to the material transfer system and including the holding furnace, an automatic furnace hole opening control device, a furnace hole balance, a boat type ladle, a rotary distributor, a casting machine and a slag scraping robot, where the smelting casting system is configured to burden and purify the primary aluminum; the casting machine is started after a furnace burdening smelting operation is completed, the automatic furnace hole opening control device automatically adjusts, according to a level of molten aluminum of the holding furnace and subsequent conditions, an opening of a furnace hole to maintain a reasonable production speed, flow of the molten aluminum is adjusted and controlled by means of the balance through the chute, then the molten aluminum enters the boat type ladle, and enters a casting mold through the rotary distributor, and dross on a surface of the molten aluminum is removed by means of the slag scraping robot; and the casting machine continuously runs to complete continuous casting, an aluminum ingot is marked with a melting number steel seal, an inspection seal and a trademark brand related seal through a printing device, enters a cooling conveyor by means of matching between a stripping knocking device and a reception device, and is driven by the cooling conveyor to perform secondary direct water cooling, and the aluminum ingot after water discharge enters a quality inspection system;

the quality inspection system connected to the smelting casting system and including an aluminum ingot centering device, a quality visual inspection device and an abnormal member elimination device, where the quality inspection system is configured to complete ingot inspection work; the ingot inspection work includes automatic centering of a skewed aluminum ingot, appearance quality inspection and offline elimination of a quality abnormal member; and an aluminum ingot qualified in quality inspection enters a product package system;

the product package system connected to the quality inspection system and including a palletizing robot, an unmanned measuring device, a bundling device and a laser marking device, where the product package system is configured to palletize, weigh, measure, mark and label an aluminum ingot product, so as to complete rapid package of the product; and a packaged aluminum ingot stack is transported to a product storage system;

the product storage system connected to the product package system and including a warehousing and conveying AGV ladle trailer or track slab trolley, an unmanned forklift, an intelligent loading trolley and a transfer warehouse, where the product storage system is configured to complete warehousing and stockpiling of the aluminum ingot and loading for export; and a human-computer interaction unit connected to the material transfer system, the smelting casting system, the quality inspection system, the product package system and the product storage system separately, and configured to:

control starting and stopping of the material transfer system, the smelting casting system, the quality inspection system, the product package system or the product storage system; where the workshop process configuration at least includes:

an intelligent ladle trailer, an intelligent ladle lifting trolley, an automatic casting speed control device, a slag scraping robot, a quality visual inspection device, an abnormal member elimination device, a palletizing robot, a bundling machine, a laser marking device, an AGV ladle trailer or track slab trolley, an unmanned forklift and an intelligent loading trolley.

Optionally, the material transfer system includes:

the intelligent ladle trailer, the intelligent ladle lifting trolley and the automatic ladle tilting device; and a single casting production line for the unmanned casting workshop for the primary aluminum and the aluminum alloy is provided with the automatic casting speed control device, the slag scraping robot, the quality visual inspection device, the abnormal member elimination device, the palletizing robot, the bundling device, the laser marking machine, the AGV ladle trailer, the unmanned forklift and the intelligent loading trolley.

Optionally, the intelligent ladle trailer is an AGV ladle trailer; the AGV ladle trailer includes a sensing input module, a vision calculation processing module, a driving control module, a signal recognition processing module and other auxiliary modules; the AGV ladle trailer is connected to a ground weigher control system;

the intelligent ladle lifting trolley includes a trolley body, a positioning device, an anti-swing device, an automatic hooking and unhooking device and a trolley controlling and scheduling system; the positioning signal of the intelligent ladle trailer is transmitted to the trolley controlling and scheduling system; and operation state information data of the AGV ladle trailer and the intelligent ladle lifting trolley is connected to an industrial data fusion system for governance and fusion, obtained fused data is provided to the intelligent casting workshop control system, and the intelligent casting workshop control system performs job scheduling and production control according to a calculation result through calculation of a scheduling model of the intelligent casting workshop control system in combination with a production and scheduling plan.

Optionally, the automatic casting speed control device includes a drive control module, a linear drive motor, a holding furnace plug, a liquid level data acquisition module and a temperature data acquisition module, where the drive control module is mounted at an outlet position of the furnace hole of the holding furnace, and is configured to control an actuation mechanism of the holding furnace plug to control the opening of the furnace hole of the holding furnace; and the liquid level data acquisition module and the temperature data acquisition module are mounted at positions of the casting machine, and are configured to acquire a liquid level and temperature of aluminum water in a boat type steel mold to complete closed-loop control over the automatic casting speed control device.

Optionally, the quality visual inspection device includes a machine vision light source, a lens, an industrial camera, an image acquisition card, a vision processor and a system integration, where aluminum ingot appearance information is converted into an image signal through the industrial camera, to be transmitted to an image processing system, the image signal is converted into a digital signal in combination with pixel distribution and brightness and color information, and recognition and classification of an appearance flash edge, a pore and a slag inclusion of the aluminum ingot are completed through calculation processing; a result is transmitted to the abnormal member elimination device according to a preset allowance and other conditions to eliminate an aluminum ingot having abnormal quality; and the preset allowance and other conditions are requirements of quality standards.

Optionally, the laser marking device includes a laser, a laser power supply, a field lens, an industrial control computer and an auxiliary accessory, where the industrial control computer is connected to a measuring device system for weighing, and a quality inspection test system, and a weight of the aluminum ingot stack, a content of impurity elements of Si and Fe, a trademark brand and a batch number are printed on a surface of the aluminum ingot by means of a laser beam.

Optionally, control units of the AGV ladle trailer or track slab trolley, the unmanned forklift and the intelligent loading trolley are each connected to the intelligent casting workshop control system; and the intelligent casting workshop control system performs scheduling control on the AGV ladle trailer or track slab trolley, the unmanned forklift and the intelligent loading trolley according to operation requirements of warehouse transfer, stacking and loading.

Optionally, a centralized intelligent control system includes a programmable logic controller (PLC) control system unit, where the PLC control system unit uses a distributed control system mode; and the PLC control system includes a material transfer system control unit, a smelting casting system control unit, a quality inspection system control unit, a product package system control unit and a product storage system control unit, where the material transfer system control unit, the smelting casting system control unit, the quality inspection system control unit, the product package system control unit and the product storage system control unit operate independently of each other and are each deployed in each business system, and a signal is transmitted between the modules by means of a designated protocol.

Optionally, the industrial data fusion system includes a data fusion unit, an upper computer server and a unidirectional gateway physical isolation system; and the industrial data fusion system is configured to carry out preprocessing, feature extraction, fusion calculation and visualization of multi-source industrial data between the casting workshop, and provides services of data storage, data governance and data extraction.

Optionally, the intelligent casting workshop control system includes online sensing and intelligent apparatus facilities, the centralized control system, industrial data fusion, intelligent decision and application, an industrial network and information security system, and a knowledge standard system hierarchy.

In the embodiment of the present disclosure, unmanned casting of the primary aluminum and the aluminum alloy can be efficiently and conveniently completed by means of cooperative operation of devices and integrated operation of the system. Compared with a traditional technology and a current production status, by means of an advanced process configuration and an intelligent operation control mode, a series of problems of a harsh working environment, high manpower quota, high labor intensity, high occupational health hazards, high safety hazards, a low degree of automation, a low level of centralized control, and low degrees of informationization and intelligence of a casting workshop for primary aluminum and an aluminum alloy are solved, and a technical support is provided for improvement in an intelligent manufacturing level and high-quality development of aluminum industry.

A series of problems of scattered control of apparatuses, unstable ingot quality, low storage management efficiency, and a serious information island during casting of primary aluminum and an aluminum alloy are effectively solved, and hidden danger of personnel safety and occupational health hazards caused by a high-temperature operation environment are greatly reduced. Therefore, a new generation of information technology is comprehensively used, a novel automation apparatus is arranged in the casting workshop, and a full-process centralized control system is used to optimize dynamic connection of production, supply and marketing, which is of great significance for achievement of unattended operation and intelligent control in the casting workshop, and can effectively promote improvement in an intelligent manufacturing level of the aluminum industry, promote a new industrialization process, and achieve overall transformation and upgrading of the industry and high-quality development.

BRIEF DESCRIPTION OF THE DRAWINGS

In order to illustrate the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art would further be able to derive other accompanying drawings from these accompanying drawings without making creative efforts.

Figure 1:
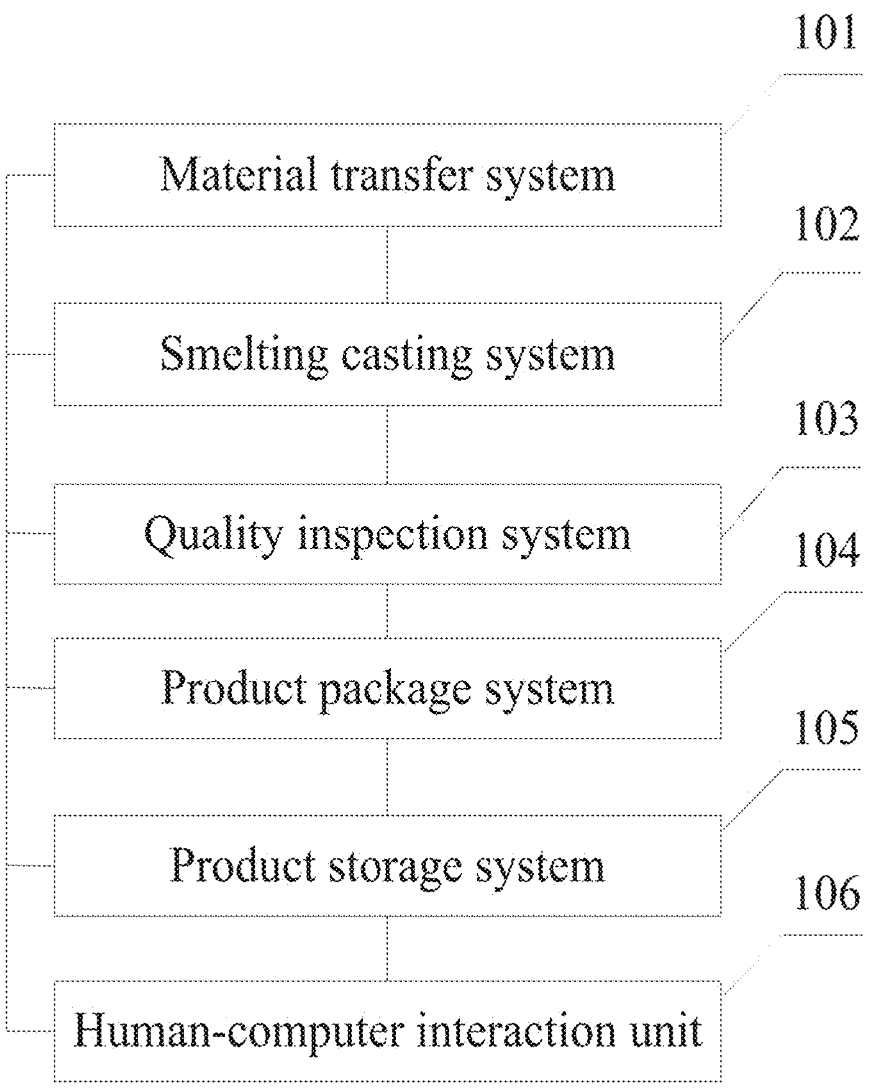
FIG. 1 is a schematic structural diagram of a process configuration and control system for an unmanned casting workshop for primary aluminum and an aluminum alloy according to an embodiment of the present disclosure.

DESCRIPTION OF REFERENCE NUMERALS material transfer system—101, smelting casting system—102, quality inspection system—103, product package system—104, product storage system—105, human-computer interaction unit—106, pneumatic rapid cooling device—1, master station receiving and dispatching cabinet—2, sample conveying bin—3, pneumatic conveying pipeline—4, slave station receiving and dispatching cabinet—5, industrial robot—6, automatic sample bin opening and closing device—7, funnel-shaped cooling water tank—8, industrial robot—9, sample tray—10, industrial robot gripper—11, modified computer numerical control lathe—12, sample tray sliding track—13, industrial robot—14, spark table surface and internal electrode cleaning device—15, spark direct-reading spectrometer—16, laser registration device—17, truss robot—18, automatic guided vehicle (AGV) ladle trailer—19, mobile digital assistant—20, and screen display apparatus—21.

DETAILED DESCRIPTION OF THE EMBODIMENTS

The technical solutions in the embodiments of the present disclosure are clearly and completely described below in combination with the accompanying drawings in the embodiments of the present disclosure. Apparently, the described embodiments are only some embodiments rather than all embodiments of the present disclosure. All other embodiments obtained by those of ordinary skill in the art on the basis of the embodiments of the present disclosure without making creative efforts shall fall within the scope of protection of the present disclosure.

An objective of the present disclosure is to provide a process configuration and control system for an unmanned casting workshop for primary aluminum and an aluminum alloy, so as to solve the problems of a harsh working environment, high manpower quota, high labor intensity, high occupational health hazards, high safety hazards, a low degree of automation, a low level of centralized control, and low degrees of informationization and intelligence of an existing casting workshop for primary aluminum.

In order to make the above objectives, features and advantages of the present disclosure clearer and more comprehensible, the present disclosure will be further described in detail below in combination with the accompanying drawings and the particular implementations.

Figure 2:
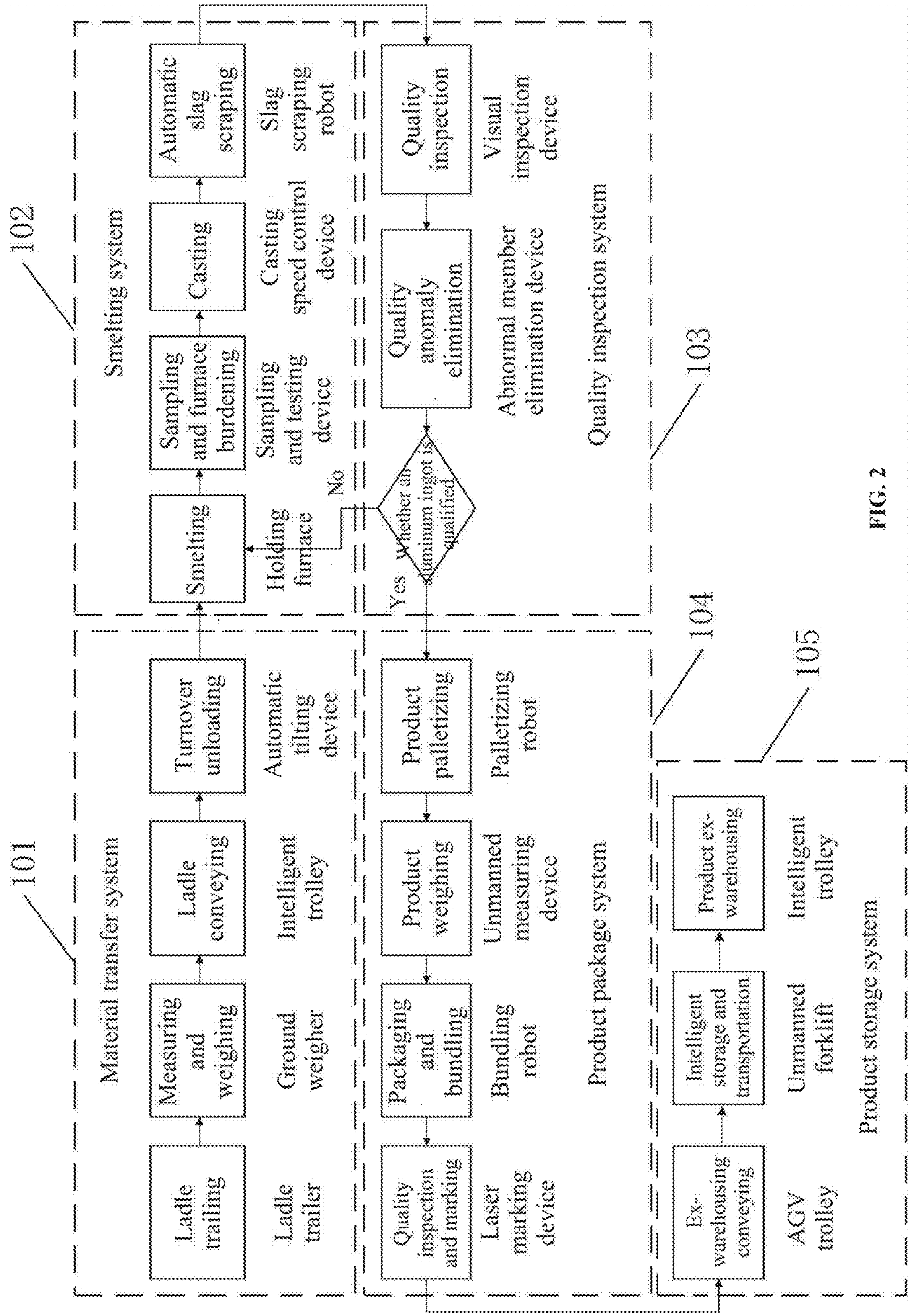
FIG. 2 is a process flow diagram according to an embodiment of the present disclosure.
Figure 3:
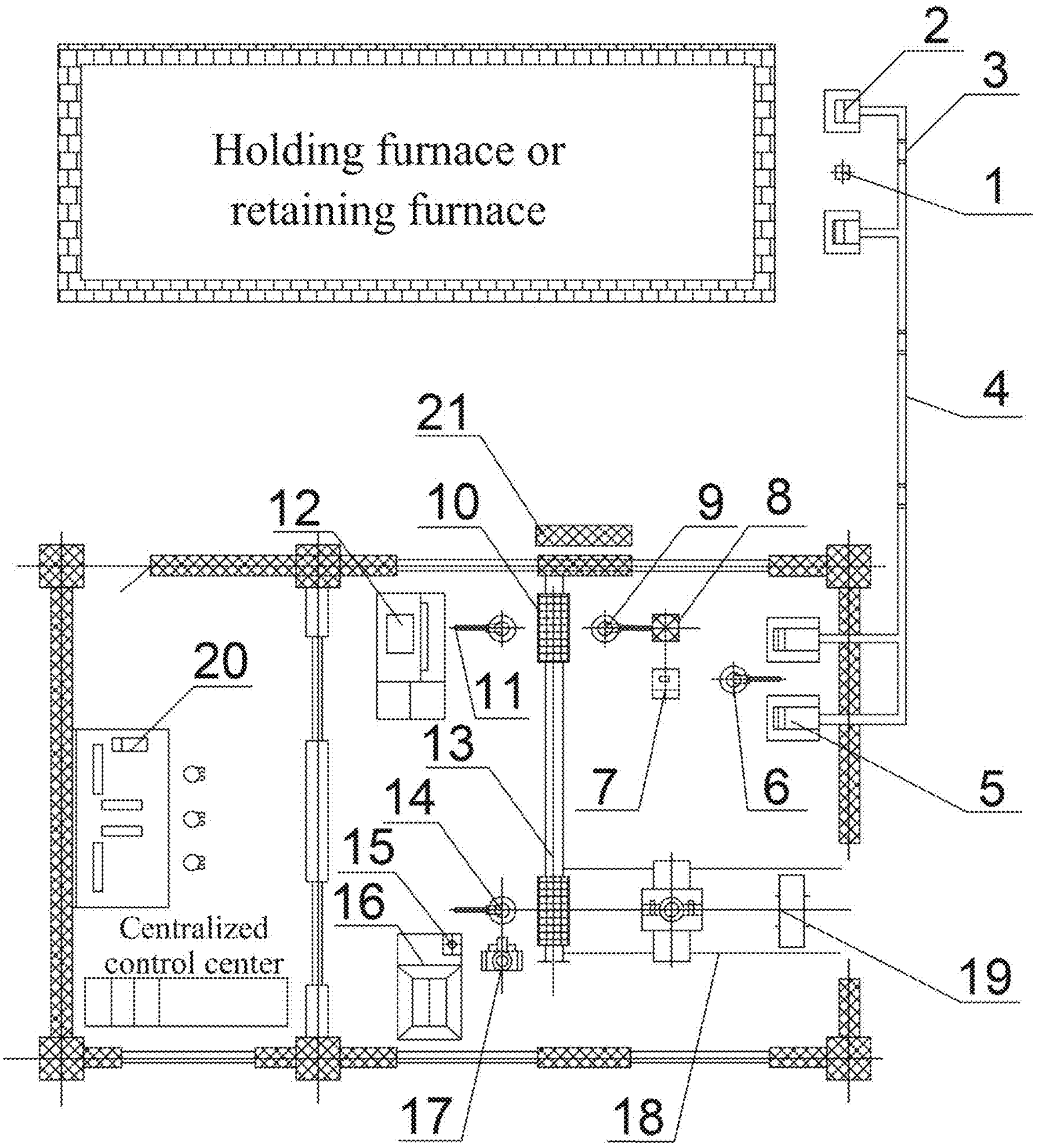
FIG. 3 is a system configuration diagram according to an embodiment of the present disclosure.

FIGS. 1 and 2 show an exemplary structure of a process configuration and control system for an unmanned casting workshop for primary aluminum and an aluminum alloy. Each module is described in detail below.

The process configuration and control system for an unmanned casting workshop for primary aluminum and an aluminum alloy mainly includes: a workshop process configuration and an intelligent casting workshop control system. The intelligent casting workshop control system mainly includes: a material transfer system 101, a smelting casting system 102, a quality inspection system 103, a product package system 104 and a product storage system 105.

The material transfer system 101 includes an automatic guided vehicle (AGV) ladle trailer, a ground weigher, an intelligent ladle lifting trolley, and an automatic ladle tilting device; the material transfer system is configured to transfer the primary aluminum from an electrolytic workshop to the casting workshop; a metal ladle containing liquid primary aluminum is trailed to the casting workshop through the AGV ladle trailer, weighed and measured through the ground weigher, and lifted to an automatic tilting device station having a highest demand priority by the intelligent ladle hoisting trolley through calculation of a scheduling algorithm of the intelligent casting workshop control system in combination with a liquid level of a holding furnace and operation plan requirements, the tilting device receives a positioning signal, and then automatically tilts the ladle, and molten aluminum flows out to be injected into the holding furnace through a chute; and the positioning signal is sent by a sensor of the AGV ladle trailer.

The material transfer system 101 includes:

- the intelligent ladle trailer, the intelligent ladle lifting trolley and the automatic ladle tilting device; and
- a single casting production line for the unmanned casting workshop for the primary aluminum and the aluminum alloy is provided with an automatic casting speed control device, a slag scraping robot, a quality visual inspection device, an abnormal member elimination device, a palletizing robot, a bundling device, a laser marking machine, the AGV ladle trailer, an unmanned forklift and an intelligent loading trolley.

The intelligent ladle trailer is an AGV ladle trailer; the AGV ladle trailer includes a sensing input module, a vision calculation processing module, a driving control module, a signal recognition processing module and other auxiliary modules; the AGV ladle trailer is connected to a ground weigher control system;

- the intelligent ladle lifting trolley includes a trolley body, a positioning device, an anti-swing device, an automatic hooking and unhooking device and a trolley controlling and scheduling system; the positioning signal of the intelligent ladle trailer is transmitted to the trolley controlling and scheduling system; and
- operation state information data of the AGV ladle trailer and the intelligent ladle lifting trolley is connected to an industrial data fusion system for governance and fusion, obtained fused data is provided to the intelligent casting workshop control system, and the intelligent casting workshop control system performs job scheduling and production control according to a calculation result through calculation of a scheduling model of the intelligent casting workshop control system in combination with a production and scheduling plan.

In an example, a new energy electric vehicle mainly includes a sensing input module, a vision calculation processing module, a driving control module, a signal recognition processing module and other auxiliary modules, and the new energy electric vehicle is connected to a weighing unit (ground weigher control system) and a human-computer interaction unit 106.

The intelligent ladle lifting trolley includes a trolley body, a positioning device, an anti-swing device, an automatic hooking and unhooking device and a trolley controlling and scheduling system. A positioning signal of the intelligent ladle lifting trolley is transmitted to the trolley controlling and scheduling system. Operation state information data of the AGV ladle trailer and the intelligent ladle lifting trolley is connected to an industrial data fusion system for governance and fusion, obtained fused data is provided to the intelligent casting workshop control system, and the intelligent casting workshop control system performs job scheduling and production control according to a calculation result through calculation of a scheduling model of the intelligent casting workshop control system in combination with a production and scheduling plan.

Compared with a traditional technology, the AGV ladle trailer and the intelligent ladle lifting trolley can achieve unmanned driving, automatic positioning and reasonable operation scheduling.

The automatic ladle tilting device is connected to the intelligent ladle lifting trolley and the human-computer interaction unit separately, and is configured to tilt the primary aluminum and the aluminum alloy on the automatic tilting device station having a highest demand priority according to a first control instruction, and the ladle enters the holding furnace.

In an example, a metal ladle containing liquid primary aluminum is trailed to the casting workshop through the AGV ladle trailer, weighed and measured through the ground weigher, and lifted to an automatic tilting device station having a highest demand priority by the intelligent ladle hoisting trolley through calculation of a scheduling algorithm of the intelligent casting workshop control system in combination with a liquid level of a holding furnace and operation plan requirements, the tilting device receives a positioning signal, and then automatically tilts the ladle, and molten aluminum flows out to be injected into the holding furnace through a chute.

The smelting casting system 102 is connected to the material transfer system and includes the holding furnace, an automatic furnace hole opening control device, a furnace hole balance, a boat type ladle, a rotary distributor, a casting machine and a slag scraping robot; the smelting casting system is configured to burden and purify the primary aluminum; the casting machine is started after a furnace burdening smelting operation is completed, the automatic furnace hole opening control device automatically adjusts, according to a level of molten aluminum of the holding furnace and subsequent conditions, an opening of a furnace hole to maintain a reasonable production speed, flow of the molten aluminum is adjusted and controlled by means of the balance through the chute, then the molten aluminum enters the boat type ladle, and enters a casting mold through the rotary distributor, and dross on a surface of the molten aluminum is removed by means of the slag scraping robot; and the casting machine continuously runs to complete continuous casting, an aluminum ingot is marked with a melting number steel seal, an inspection seal and a trademark brand related seal through a printing device, enters a cooling conveyor by means of matching between a stripping knocking device and a reception device, and is driven by the cooling conveyor to perform secondary direct water cooling, and the aluminum ingot after water discharge enters a quality inspection system.

The automatic casting speed control device includes a drive control module, a linear drive motor, a holding furnace plug, a liquid level data acquisition module and a temperature data acquisition module.

The drive control module is mounted at an outlet position of the furnace hole of the holding furnace, and is configured to control an actuation mechanism of the holding furnace plug to control the opening of the furnace hole of the holding furnace; and the liquid level data acquisition module and the temperature data acquisition module are mounted at positions of the casting machine, and are configured to acquire a liquid level and temperature of aluminum water in a boat type steel mold to complete closed-loop control over the automatic casting speed control device.

Figure 7:
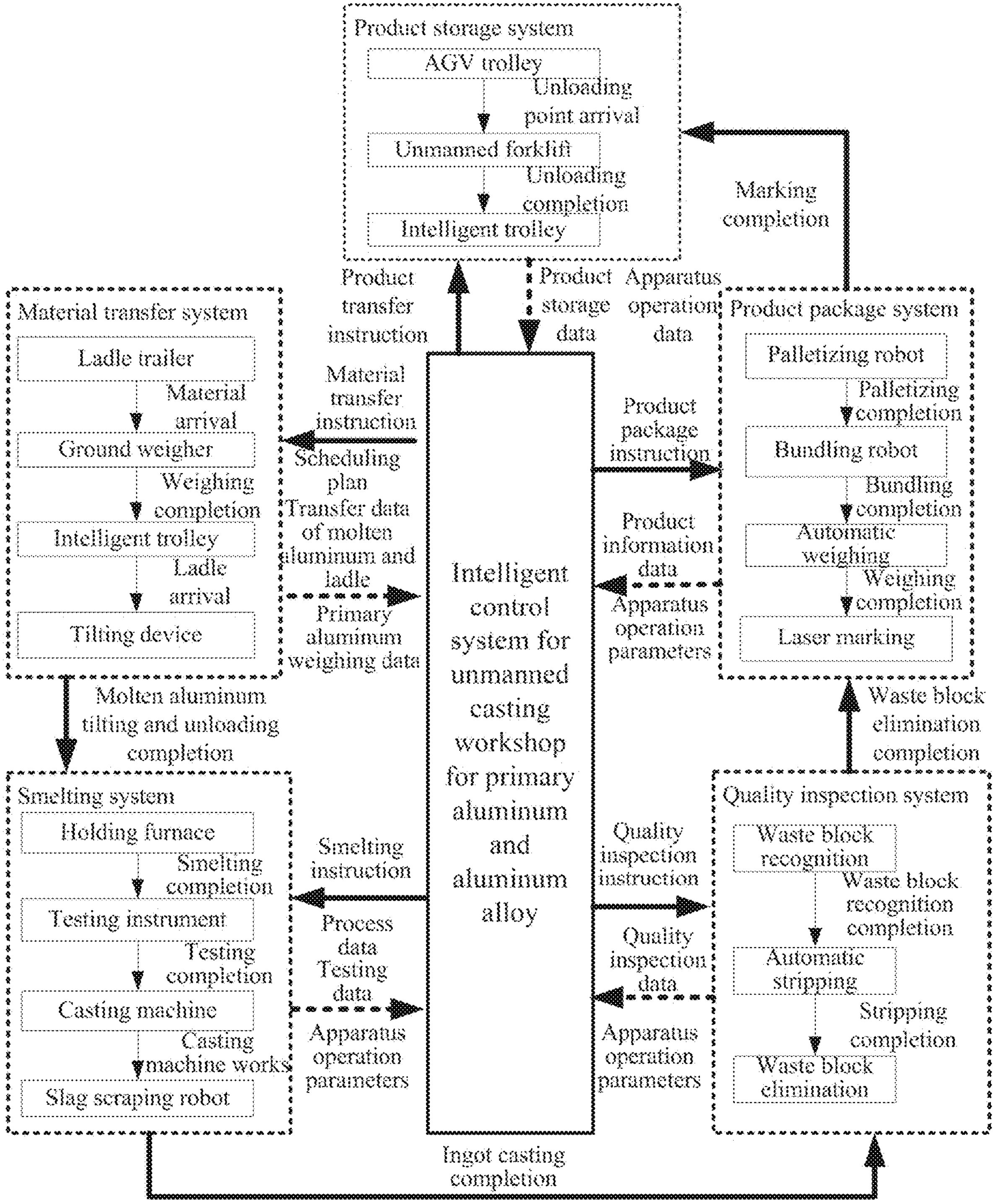
FIG. 7 is a control schematic diagram according to an embodiment of the present disclosure.

In an example, with reference to FIG. 7, a smelting casting system 102 mainly completes burdening and purification of the primary aluminum, the casting machine is started after a furnace burdening smelting operation is completed, an automatic furnace hole opening control device automatically adjusts, according to a level of molten aluminum of the holding furnace and subsequent conditions, an opening of a furnace hole to maintain a reasonable production speed, flow of the molten aluminum is adjusted and controlled by means of the balance through the chute, then the molten aluminum enters a boat type ladle, and enters a casting mold through a rotary distributor, and dross on a surface of the molten aluminum is removed by means of a slag scraping robot. A casting machine continuously runs to complete continuous casting, an aluminum ingot is marked with a melting number steel seal, an inspection seal and a trademark brand related seal through a printing device, enters a cooling conveyor by means of matching between a stripping knocking device and a reception device, and is driven by the cooling conveyor to perform secondary direct water cooling, and the aluminum ingot after water discharge enters a quality inspection system 103.

In an example, a drive control module is mounted at an outlet position of a furnace hole of a holding furnace, and is configured to control an actuation mechanism of a holding furnace plug to automatically control an opening of the furnace hole of the holding furnace; and a liquid level data acquisition module and a temperature data acquisition module are mounted at positions of a casting machine, and are configured to acquire a liquid level and temperature of aluminum water in a boat type steel mold, establish a furnace hole opening control model through a mathematical algorithm in combination with the liquid level and temperature and a rotation speed of a rotary distributor, transmit a calculation result to an actuation mechanism to achieve closed-loop control over the opening of the furnace hole. The technology can automatically open and close the furnace hole and intelligently adjust the opening, and solve uncertainty of existing human control.

Figure 4:
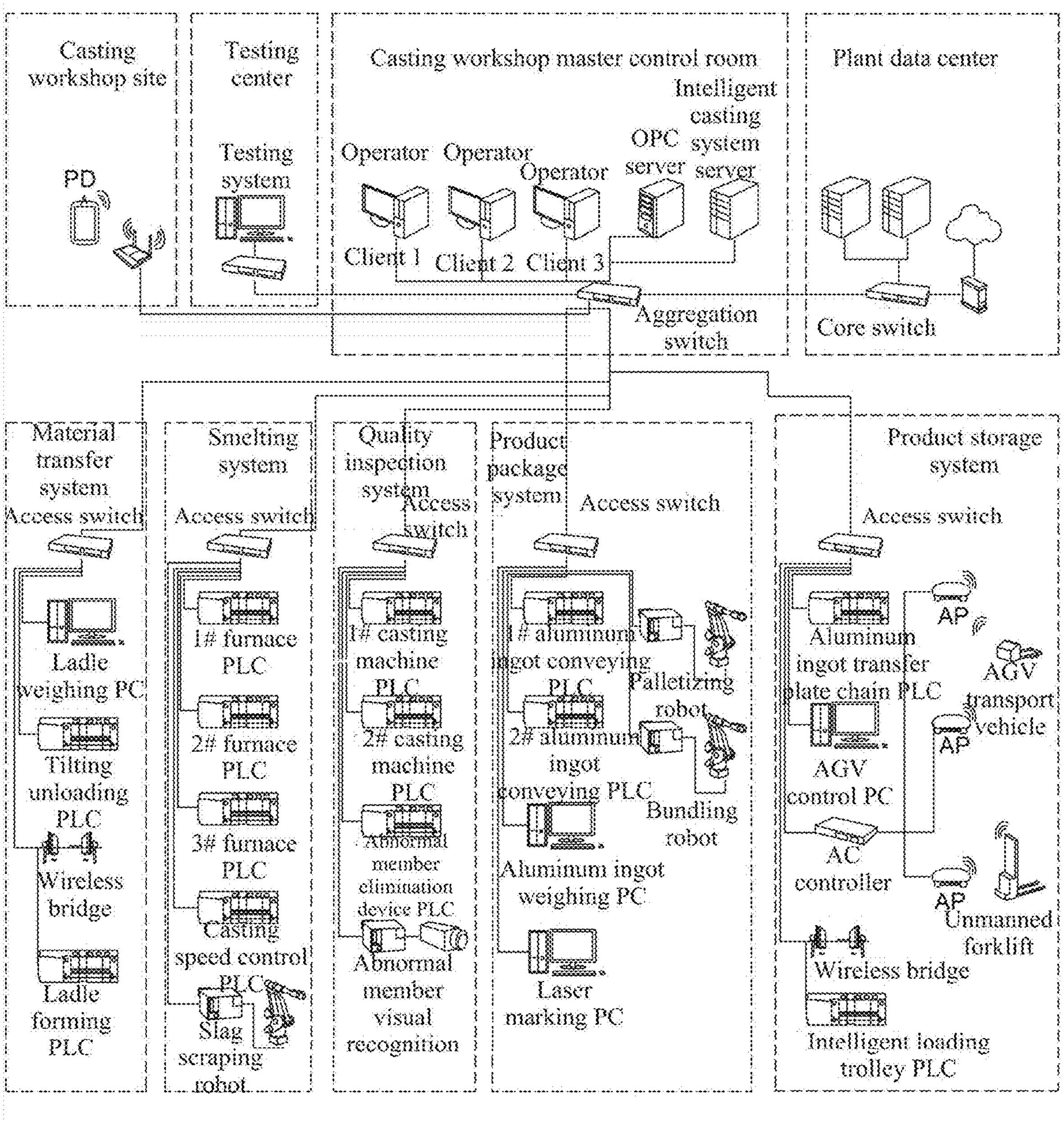
FIG. 4 is a topology diagram of Internet of Things according to an embodiment of the present disclosure.

In an example, with reference to FIGS. 2 and 4, each system in a workshop is provided with an AGV ladle trailer, an intelligent ladle lifting trolley, an automatic casting speed control device, a slag scraping robot, a quality visual inspection device, an abnormal member elimination device, a palletizing robot, a bundling machine, a laser marking device, an AGV trolley or track slab trolley, an unmanned forklift and an intelligent loading trolley (or gantry crane) along a production line.

The quality inspection system 103 is connected to the smelting casting system and includes an aluminum ingot centering device, a quality visual inspection device and an abnormal member elimination device; the quality inspection system is configured to complete ingot inspection work; the ingot inspection work includes automatic centering of a skewed aluminum ingot, appearance quality inspection and offline elimination of a quality abnormal member; and an aluminum ingot qualified in quality inspection enters a product package system.

The quality visual inspection device includes a machine vision light source, a lens, an industrial camera, an image acquisition card, a vision processor and a system integration; aluminum ingot appearance information is converted into an image signal through the industrial camera, to be transmitted to an image processing system, the image signal is converted into a digital signal in combination with pixel distribution and brightness and color information, and recognition and classification of an appearance flash edge, a pore and a slag inclusion of the aluminum ingot are completed through calculation processing; a result is transmitted to an abnormal member elimination device according to a preset allowance and other conditions to eliminate an aluminum ingot having abnormal quality; and the preset allowance and other conditions are requirements of quality standards.

The laser marking device includes a laser, a laser power supply, a field lens, an industrial control computer and an auxiliary accessory. The industrial control computer is connected to a measuring device system for weighing, and a quality inspection test system, and a weight of the aluminum ingot stack, a content of impurity elements of Si and Fe, a trademark brand and a batch number are printed on a surface of the aluminum ingot by means of a laser beam.

In an example, a quality inspection system 103 mainly completes ingot inspection work. The ingot inspection work includes automatic centering of a skewed aluminum ingot, appearance quality inspection and offline elimination of a quality abnormal member. An aluminum ingot qualified in quality inspection enters a product package system 104.

Under the condition of movement of the aluminum ingot, aluminum ingot appearance information is converted into an image signal through the industrial camera, to be transmitted to an image processing system, and recognition of appearance quality and defect types of an appearance flash edge, a pore and a slag inclusion of the aluminum ingot is completed sequentially through image enhancement, data coding transmission, smoothing, edge sharpening, segmentation, feature extraction, image recognition, etc. in combination with pixel distribution and brightness and color information. A result is transmitted to the abnormal member elimination device according to a preset allowance and other conditions to eliminate an aluminum ingot having abnormal quality. Compared with traditional manual duty, the technology is mature and can achieve unattended duty and significantly improve accuracy of defect recognition of the aluminum ingot.

The product package system 104 is connected to the quality inspection system and includes a palletizing robot, an unmanned measuring device, a bundling device and a laser marking device. The product package system is configured to palletize, weigh, measure, mark and label an aluminum ingot product, so as to complete rapid package of the product; and a packaged aluminum ingot stack is transported to a product storage system.

Control units of the AGV ladle trailer or track slab trolley, the unmanned forklift and the intelligent loading trolley are each connected to the intelligent casting workshop control system; and the intelligent casting workshop control system performs scheduling control on the AGV ladle trailer or track slab trolley, the unmanned forklift and the intelligent loading trolley according to operation requirements of warehouse transfer, stacking and loading.

A centralized intelligent control system includes a programmable logic controller (PLC) control system unit; the PLC control system unit uses a distributed control system mode; and the PLC control system includes a material transfer system control unit, a smelting casting system control unit, a quality inspection system control unit, a product package system control unit and a product storage system control unit, where the material transfer system control unit, the smelting casting system control unit, the quality inspection system control unit, the product package system control unit and the product storage system control unit operate independently of each other and are each deployed in each business system, and a signal is transmitted between the modules by means of a designated protocol.

In an example, a product package system 104 mainly palletizes, weighs, measures, marks and labels an aluminum ingot product, so as to complete rapid package of the product; and a packaged aluminum ingot stack is transported to a product storage system.

The laser marking device mainly consists of a laser, a laser power supply, a field lens, an industrial control computer and an auxiliary accessory. The industrial control computer is connected to a measuring device system for weighing, and a quality inspection test system, timely acquires weight and quality inspection data of the aluminum ingot stack, and timely prints information such as the weight of the aluminum ingot stack, a content of impurity elements of Si and Fe, a trademark brand, a batch number and a two-dimensional code on a surface of the aluminum ingot by means of a laser beam. Laser etching printing solves tedious tasks of manual printing and labeling. Label information is clear and firm. The two-dimensional code can effectively achieve traceability of quality information.

The product storage system 105 is connected to the product package system and includes a warehousing and conveying AGV ladle trailer or track slab trolley, an unmanned forklift, an intelligent loading trolley and a transfer warehouse; and the product storage system is configured to complete warehousing and stockpiling of the aluminum ingot and loading for export.

In an example, a product storage system 105 mainly includes a warehousing and conveying AGV trolley (or track slab trolley), an unmanned forklift, an intelligent loading trolley (or gantry crane), a transfer warehouse and a human-computer interaction unit. Control units of the AGV trolley (or track slab trolley), the unmanned forklift and the intelligent loading trolley (or gantry crane) are each connected to the intelligent casting workshop control system. The intelligent casting workshop control system performs scheduling control on the AGV trolley or track slab trolley, the unmanned forklift and the intelligent loading trolley (or gantry crane) according to operation requirements of warehouse transfer, palletizing and loading. The technology effectively solves the problems of uneven busyness of process vehicles and unreasonable task allocation.

A human-computer interaction unit 106 is connected to the material transfer system 101, the smelting casting system 102, the quality inspection system 103, the product package system 104 and the product storage system 105 separately, and the human-computer interaction unit 106 is configured to:

- control starting and stopping of the material transfer system 101, the smelting casting system 102, the quality inspection system 103, the product package system 104 and the product storage system 105.

In an example, with reference to FIG. 4, a human-computer interaction unit 106 is provided with a PLC control system unit. Each module of the PLC control system unit is deployed in a distributed control system mode (i.e. centralized management and decentralized control), and includes a material transfer system control unit, a smelting casting system control unit, a quality inspection system control unit, a product package system control unit and a product storage system control unit. Each module of the PLC control system unit operates independently of each other and is deployed in each process business system, a signal is transmitted between the modules by means of a designated protocol (transmission control protocol/Internet protocol (TCP/IP), Modbus communication protocol, RS485, etc.), and each control unit is connected to the intelligent casting workshop control system for information interaction.

The industrial data fusion system includes a data fusion unit, an upper computer server and a unidirectional gateway physical isolation system; and the industrial data fusion system is configured to carry out preprocessing, feature extraction, fusion calculation and visualization of multi-source industrial data between the casting workshop, and provides services of data storage, data governance and data extraction.

The intelligent casting workshop control system includes online sensing and intelligent apparatus facilities, the centralized control system, industrial data fusion, intelligent decision and application, an industrial network and information security system, and a knowledge standard system hierarchy.

The workshop process configuration at least includes:

- an intelligent ladle trailer, an intelligent ladle lifting trolley, an automatic casting speed control device, a slag scraping robot, a quality visual inspection device, an abnormal member elimination device, a palletizing robot, a bundling machine, a laser marking device, an AGV ladle trailer or track slab trolley, an unmanned forklift and an intelligent loading trolley.

Figure 5:
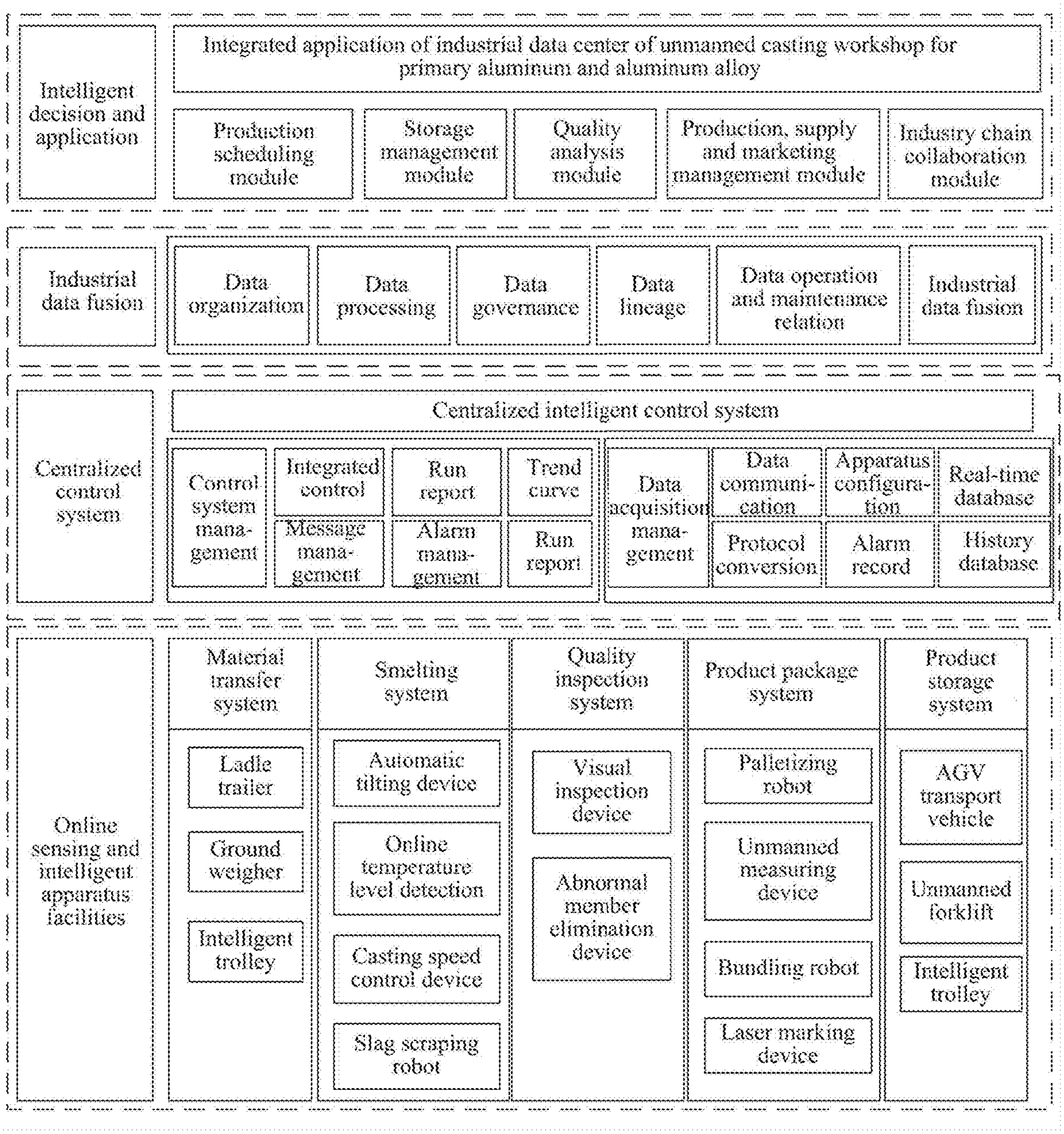
FIG. 5 is a system architecture diagram according to an embodiment of the present disclosure.

With reference to FIG. 5, an industrial data fusion system mainly includes a data fusion unit, an upper computer server and a unidirectional gateway physical isolation system. Acquisition, preprocessing, feature extraction, fusion calculation and visualization of multi-source industrial data between the casting workshop are carried out. The multi-source industrial data mainly includes key apparatus operation state data, production process data, operation task data, etc. The industrial data fusion system mainly provides services of data storage, data governance, analysis and mining, data extraction, etc.

Figure 6:
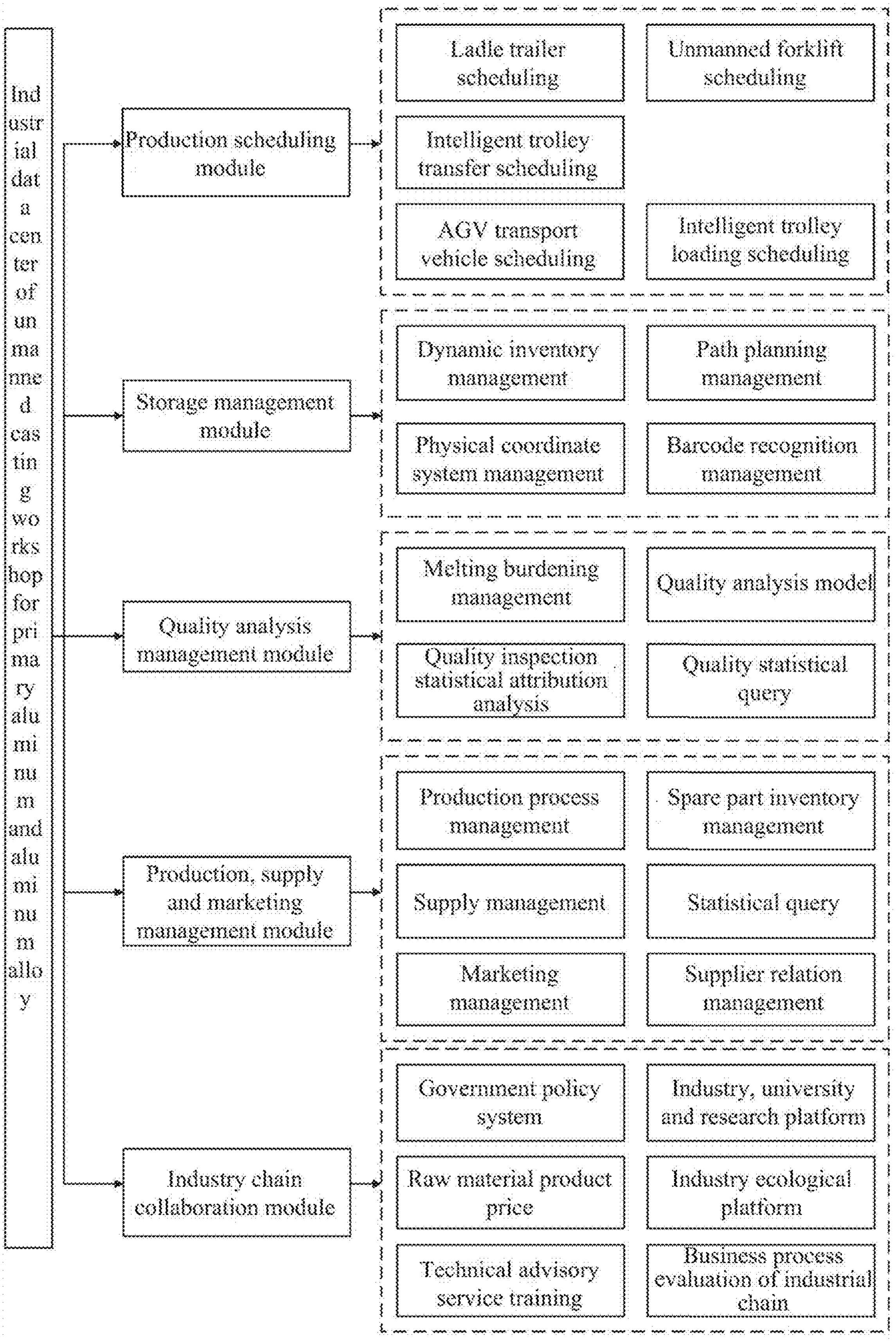
FIG. 6 is a data information fusion diagram according to an embodiment of the present disclosure.

With reference to FIG. 6, the intelligent management and control system includes online sensing and intelligent apparatus facilities, a centralized control system, industrial data fusion, intelligent decision and application, an industrial network and information security system, and a knowledge standard system hierarchy. The intelligent decision and application mainly includes a production scheduling module, a storage management module, a quality analysis module, a production, supply and marketing management module and an industrial chain collaboration module.

To sum up, in the embodiment of the present disclosure, unmanned casting of the primary aluminum and the aluminum alloy can be efficiently and conveniently completed by means of cooperative operation of devices and integrated operation of the system. Compared with a traditional technology and a current production status, by means of an advanced process configuration and an intelligent operation control mode, a series of problems of a harsh working environment, high manpower quota, high labor intensity, high occupational health hazards, high safety hazards, a low degree of automation, a low level of centralized control, and low degrees of informationization and intelligence of a casting workshop for primary aluminum and an aluminum alloy are solved, and a technical support is provided for improvement in an intelligent manufacturing level and high-quality development of aluminum industry.

A series of problems of scattered control of apparatuses, unstable ingot quality, low storage management efficiency, and a serious information island during casting of primary aluminum and an aluminum alloy are effectively solved, and hidden danger of personnel safety and occupational health hazards caused by a high-temperature operation environment are greatly reduced. Therefore, a new generation of information technology is comprehensively used, a novel automation apparatus is arranged in the casting workshop, and a full-process centralized control system is used to optimize dynamic connection of production, supply and marketing, which is of great significance for achievement of unattended operation and intelligent control in the casting workshop, and can effectively promote improvement in an intelligent manufacturing level of the aluminum industry, promote a new industrialization process, and achieve overall transformation and upgrading of the industry and high-quality development.

Each embodiment in the description is described in a progressive manner, each embodiment focuses on the differences from other embodiments, and the same and similar parts between the embodiments can refer to each other.

Specific examples are used herein for illustration of principles and embodiments of the present disclosure. The descriptions of the above embodiments are merely used for assisting in understanding the methods and core ideas of the embodiments of the present disclosure. In addition, those of ordinary skill in the art can make various modifications in terms of the particular implementations and the scope of application in accordance with the ideas of the present disclosure. In conclusion, the content of the description shall not be construed as limitations to the embodiments of the present disclosure.

What is claimed is:

1. A process configuration and control system for an unmanned casting workshop for primary aluminum and an aluminum alloy, comprising: a workshop process configuration and an intelligent casting workshop control system, wherein the intelligent casting workshop control system at least comprises:

a material transfer system comprising an automatic guided vehicle (AGV) ladle trailer, a ground weigher, an intelligent ladle lifting trolley, and an automatic ladle tilting device, wherein the material transfer system is configured to transfer the primary aluminum from an electrolytic workshop to the casting workshop; a metal ladle containing liquid primary aluminum is trailed to the casting workshop through the AGV ladle trailer, weighed and measured through the ground weigher, and lifted to an automatic tilting device station having a highest demand priority by the intelligent ladle hoisting trolley through calculation of a scheduling algorithm of the intelligent casting workshop control system in combination with a liquid level of a holding furnace and operation plan requirements, the tilting device receives a positioning signal, and then automatically tilts the ladle, and molten aluminum flows out to be injected into the holding furnace through a chute; and the positioning signal is sent by a sensor of the AGV ladle trailer;

a smelting casting system connected to the material transfer system and comprising the holding furnace, an automatic furnace hole opening control device, a furnace hole balance, a boat type ladle, a rotary distributor, a casting machine and a slag scraping robot, wherein the smelting casting system is configured to burden and purify the primary aluminum; the casting machine is started after a furnace burdening smelting operation is completed, the automatic furnace hole opening control device automatically adjusts, according to a level of molten aluminum of the holding furnace and subsequent conditions, an opening of a furnace hole to maintain a reasonable production speed, flow of the molten aluminum is adjusted and controlled by means of the balance through the chute, then the molten aluminum enters the boat type ladle, and enters a casting mold through the rotary distributor, and dross on a surface of the molten aluminum is removed by means of the slag scraping robot; and the casting machine continuously runs to complete continuous casting, an aluminum ingot is marked with a melting number steel seal, an inspection seal and a trademark brand related seal through a printing device, enters a cooling conveyor by means of matching between a stripping knocking device and a reception device, and is driven by the cooling conveyor to perform secondary direct water cooling, and the aluminum ingot after water discharge enters a quality inspection system;

the quality inspection system connected to the smelting casting system and comprising an aluminum ingot centering device, a quality visual inspection device and an abnormal member elimination device, wherein the quality inspection system is configured to complete ingot inspection work; the ingot inspection work comprises automatic centering of a skewed aluminum ingot, appearance quality inspection and offline elimination of a quality abnormal member; and an aluminum ingot qualified in quality inspection enters a product package system;

the product package system connected to the quality inspection system and comprising a palletizing robot, an unmanned measuring device, a bundling device and a laser marking device, wherein the product package system is configured to palletize, weigh, measure, mark and label an aluminum ingot product, so as to complete rapid package of the product; and a packaged aluminum ingot stack is transported to a product storage system;

the product storage system connected to the product package system and comprising a warehousing and conveying AGV ladle trailer or track slab trolley, an unmanned forklift, an intelligent loading trolley and a transfer warehouse, wherein the product storage system is configured to complete warehousing and stockpiling of the aluminum ingot and loading for export; and a human-computer interaction unit connected to the material transfer system, the smelting casting system, the quality inspection system, the product package system and the product storage system separately, and configured to:

control starting and stopping of the material transfer system, the smelting casting system, the quality inspection system, the product package system or the product storage system; wherein the workshop process configuration at least comprises:

an intelligent ladle trailer, an intelligent ladle lifting trolley, an automatic casting speed control device, a slag scraping robot, a quality visual inspection device, an abnormal member elimination device, a palletizing robot, a bundling machine, a laser marking device, an AGV ladle trailer or track slab trolley, an unmanned forklift and an intelligent loading trolley.

2. The process configuration and control system for unmanned casting workshop for primary aluminum and an aluminum alloy according to claim 1, wherein the material transfer system comprises:

the intelligent ladle trailer, the intelligent ladle lifting trolley and the automatic ladle tilting device; and a single casting production line for the unmanned casting workshop for the primary aluminum and the aluminum alloy is provided with the automatic casting speed control device, the slag scraping robot, the quality visual inspection device, the abnormal member elimination device, the palletizing robot, the bundling device, the laser marking machine, the AGV ladle trailer, the unmanned forklift and the intelligent loading trolley.

3. The process configuration and control system for an unmanned casting workshop for primary aluminum and an aluminum alloy according to claim 2, wherein the intelligent ladle trailer is an AGV ladle trailer; the AGV ladle trailer comprises a sensing input module, a vision calculation processing module, a driving control module, a signal recognition processing module and other auxiliary modules; the AGV ladle trailer is connected to a ground weigher control system;

the intelligent ladle lifting trolley comprises a trolley body, a positioning device, an anti-swing device, an automatic hooking and unhooking device and a trolley controlling and scheduling system; the positioning signal of the intelligent ladle trailer is transmitted to the trolley controlling and scheduling system; and operation state information data of the AGV ladle trailer and the intelligent ladle lifting trolley is connected to an industrial data fusion system for governance and fusion, obtained fused data is provided to the intelligent casting workshop control system, and the intelligent casting workshop control system performs job scheduling and production control according to a calculation result through calculation of a scheduling model of the intelligent casting workshop control system in combination with a production and scheduling plan.

4. The process configuration and control system for an unmanned casting workshop for primary aluminum and an aluminum alloy according to claim 3, wherein the automatic casting speed control device comprises a drive control module, a linear drive motor, a holding furnace plug, a liquid level data acquisition module and a temperature data acquisition module, wherein the drive control module is mounted at an outlet position of the furnace hole of the holding furnace, and is configured to control an actuation mechanism of the holding furnace plug to control the opening of the furnace hole of the holding furnace; and the liquid level data acquisition module and the temperature data acquisition module are mounted at positions of the casting machine, and are configured to acquire a liquid level and temperature of aluminum water in a boat type steel mold to complete closed-loop control over the automatic casting speed control device.

5. The process configuration and control system for an unmanned casting workshop for primary aluminum and an aluminum alloy according to claim 4, wherein the quality visual inspection device comprises a machine vision light source, a lens, an industrial camera, an image acquisition card, a vision processor and a system integration, wherein aluminum ingot appearance information is converted into an image signal through the industrial camera, to be transmitted to an image processing system, the image signal is converted into a digital signal in combination with pixel distribution and brightness and color information, and recognition and classification of an appearance flash edge, a pore and a slag inclusion of the aluminum ingot are completed through calculation processing; a result is transmitted to the abnormal member elimination device according to a preset allowance and other conditions to eliminate an aluminum ingot having abnormal quality; and the preset allowance and other conditions are requirements of quality standards.

6. The process configuration and control system for an unmanned casting workshop for primary aluminum and an aluminum alloy according to claim 5, wherein the laser marking device comprises a laser, a laser power supply, a field lens, an industrial control computer and an auxiliary accessory, wherein the industrial control computer is connected to a measuring device system for weighing, and a quality inspection test system, and a weight of the aluminum ingot stack, a content of impurity elements of Si and Fe, a trademark brand and a batch number are printed on a surface of the aluminum ingot by means of a laser beam.

7. The process configuration and control system for an unmanned casting workshop for primary aluminum and an aluminum alloy according to claim 6, wherein control units of the AGV ladle trailer or track slab trolley, the unmanned forklift and the intelligent loading trolley are each connected to the intelligent casting workshop control system; and the intelligent casting workshop control system performs scheduling control on the AGV ladle trailer or track slab trolley, the unmanned forklift and the intelligent loading trolley according to operation requirements of warehouse transfer, stacking and loading.

8. The process configuration and control system for an unmanned casting workshop for primary aluminum and an aluminum alloy according to claim 7, wherein a centralized intelligent control system comprises a programmable logic controller (PLC) control system unit, wherein the PLC control system unit uses a distributed control system mode; and the PLC control system comprises a material transfer system control unit, a smelting casting system control unit, a quality inspection system control unit, a product package system control unit and a product storage system control unit, wherein the material transfer system control unit, the smelting casting system control unit, the quality inspection system control unit, the product package system control unit and the product storage system control unit operate independently of each other and are each deployed in each business system, and a signal is transmitted between the modules by means of a designated protocol.

9. The process configuration and control system for an unmanned casting workshop for primary aluminum and an aluminum alloy according to claim 8, wherein the industrial data fusion system comprises a data fusion unit, an upper computer server and a unidirectional gateway physical isolation system; and the industrial data fusion system is configured to carry out preprocessing, feature extraction, fusion calculation and visualization of multi-source industrial data between the casting workshop, and provides services of data storage, data governance and data extraction.

10. The process configuration and control system for an unmanned casting workshop for primary aluminum and an aluminum alloy according to claim 9, wherein the intelligent casting workshop control system comprises online sensing and intelligent apparatus facilities, the centralized control system, industrial data fusion, intelligent decision and application, an industrial network and information security system, and a knowledge standard system hierarchy.

* * * * *